United States Patent [19]

Simmons

[11] 4,193,467
[45] Mar. 18, 1980

[54] PARKING BRAKE MOUNTING

[75] Inventor: Gerald P. Simmons, Washington, Ill.

[73] Assignee: Caterpillar Tractor Co., Peoria, Ill.

[21] Appl. No.: 859,360

[22] Filed: Dec. 13, 1977

[51] Int. Cl.² .......................... B60T 1/06; F16D 65/12
[52] U.S. Cl. .................................... 180/271; 188/18 R
[58] Field of Search ................. 180/82 R, 82 B, 70 P; 188/2 R, 71.1, 18 A, 170, 73.3

[56] References Cited

U.S. PATENT DOCUMENTS

| | | | |
|---|---|---|---|
| 1,234,290 | 7/1917 | Church | 188/18 R |
| 3,661,234 | 5/1972 | Moederndorfer et al. | 188/170 |
| 3,955,650 | 5/1976 | Ellis | 188/73.3 |
| 4,031,986 | 6/1977 | Thompson | 188/73.3 |
| 4,047,598 | 9/1977 | Thrower | 188/71.1 |

Primary Examiner—Robert R. Song
Assistant Examiner—Donn McGiehan
Attorney, Agent, or Firm—Wegner, Stellman, McCord, Wiles & Wood

[57] ABSTRACT

A brake assembly for a vehicle is mounted directly on the vehicle frame with the brake caliper straddling a brake disc carried directly on the vehicle drive line. The brake is spring applied to grab the disc and to prevent rotation of the drive line. Air pressure is used to release the brake such that loss of air pressure as when an air hose ruptures or when the air reserve is consumed by usage will permit the spring to lock the brake and prevent rotation of the drive line. The brake can be applied when the engine is running by releasing the air pressure on the brake.

7 Claims, 7 Drawing Figures

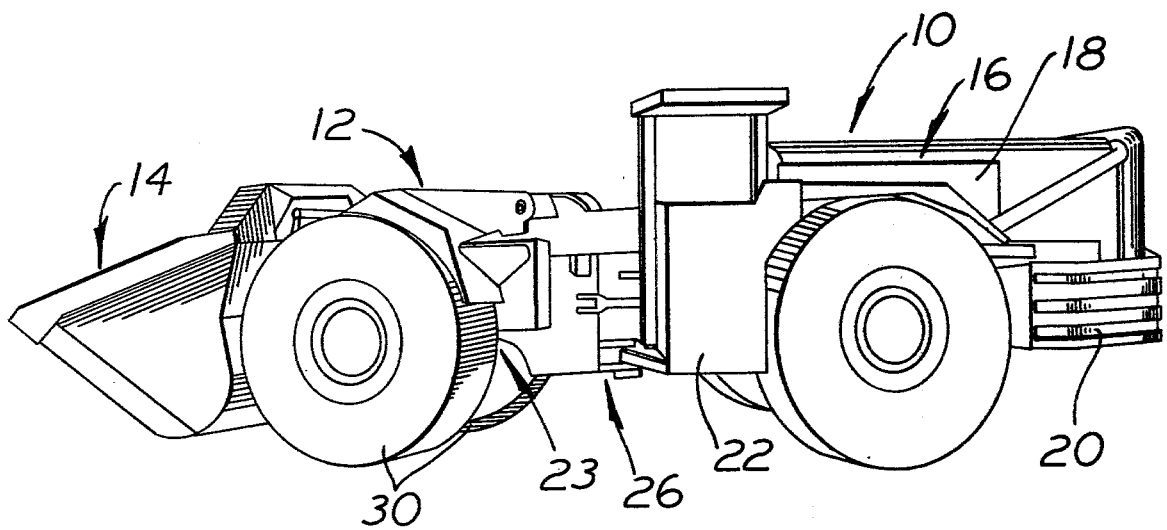
Fig-1-
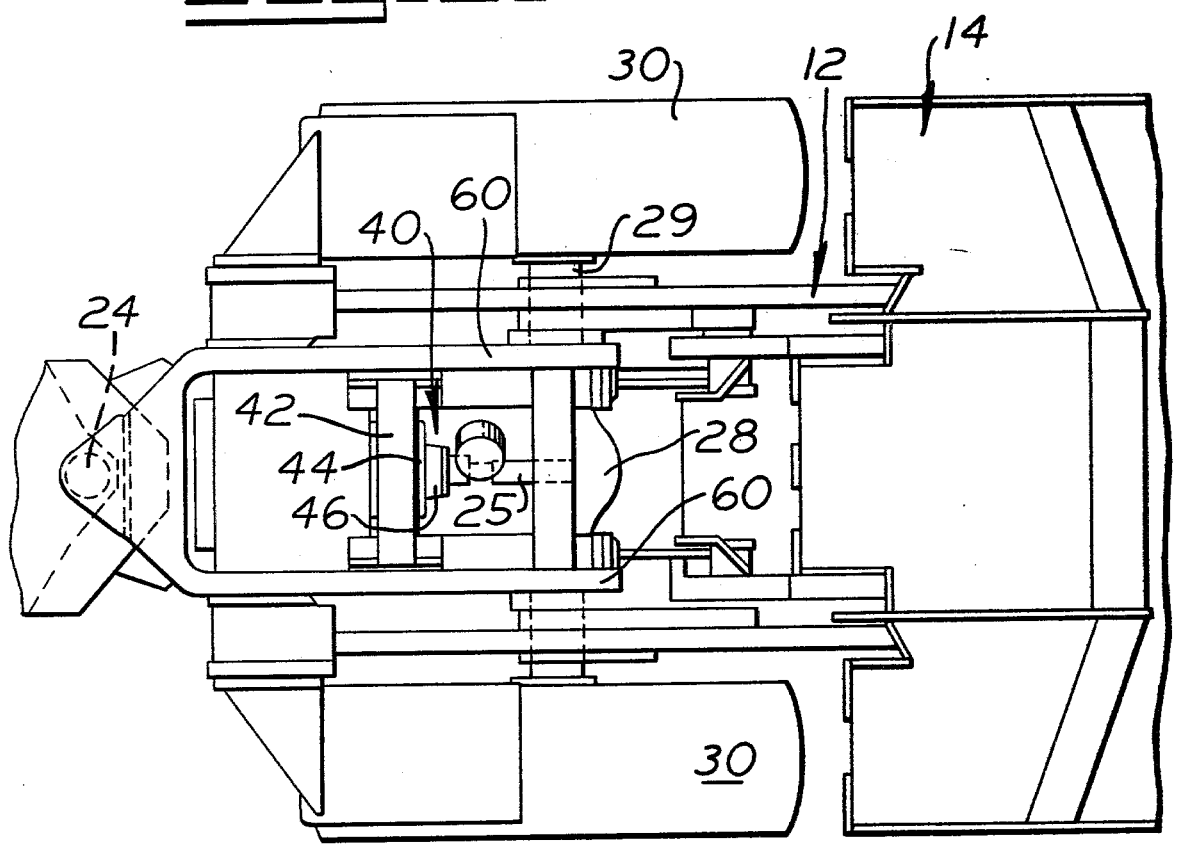
Fig-2-

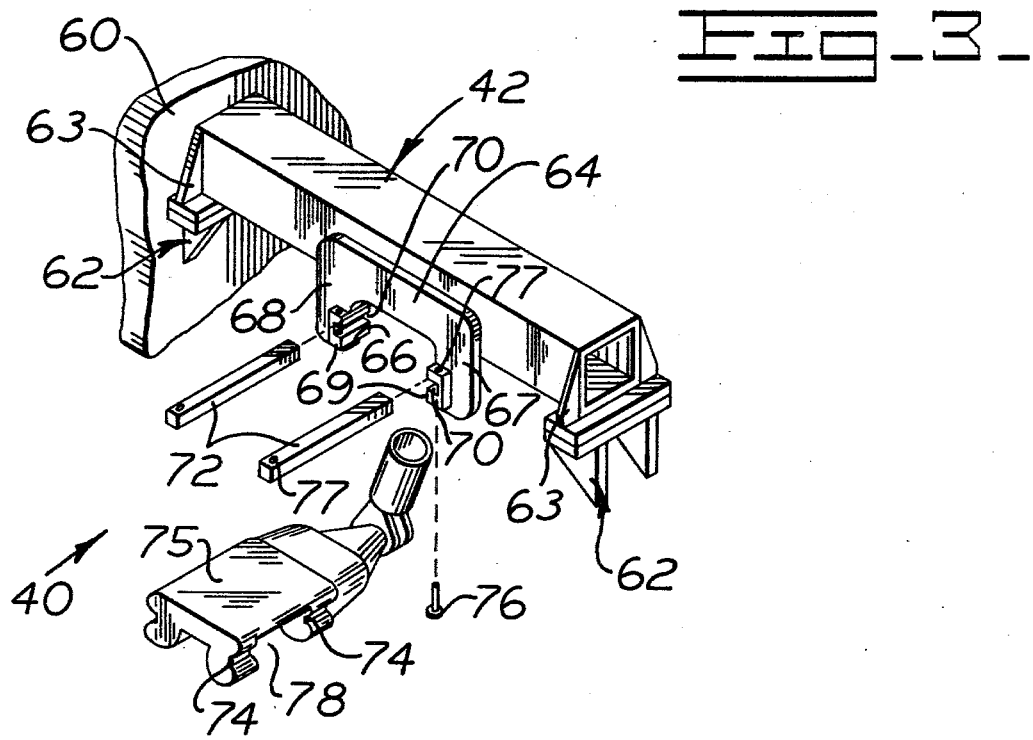
Fig_3_
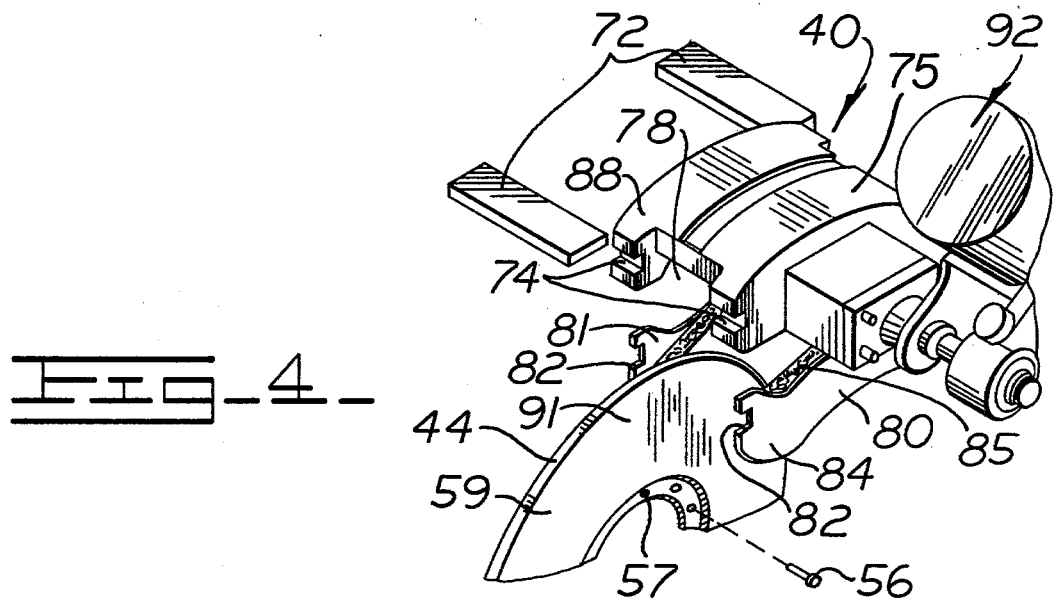
Fig_4_

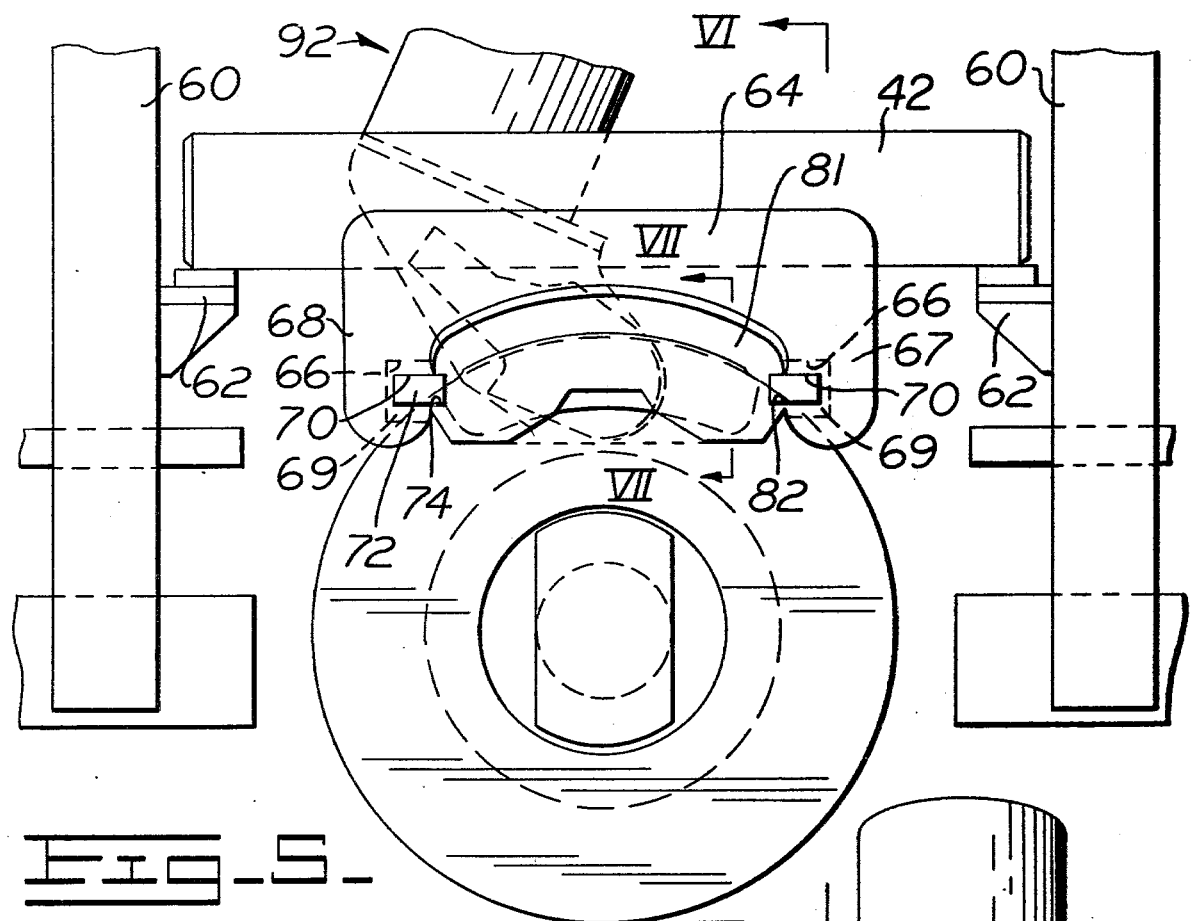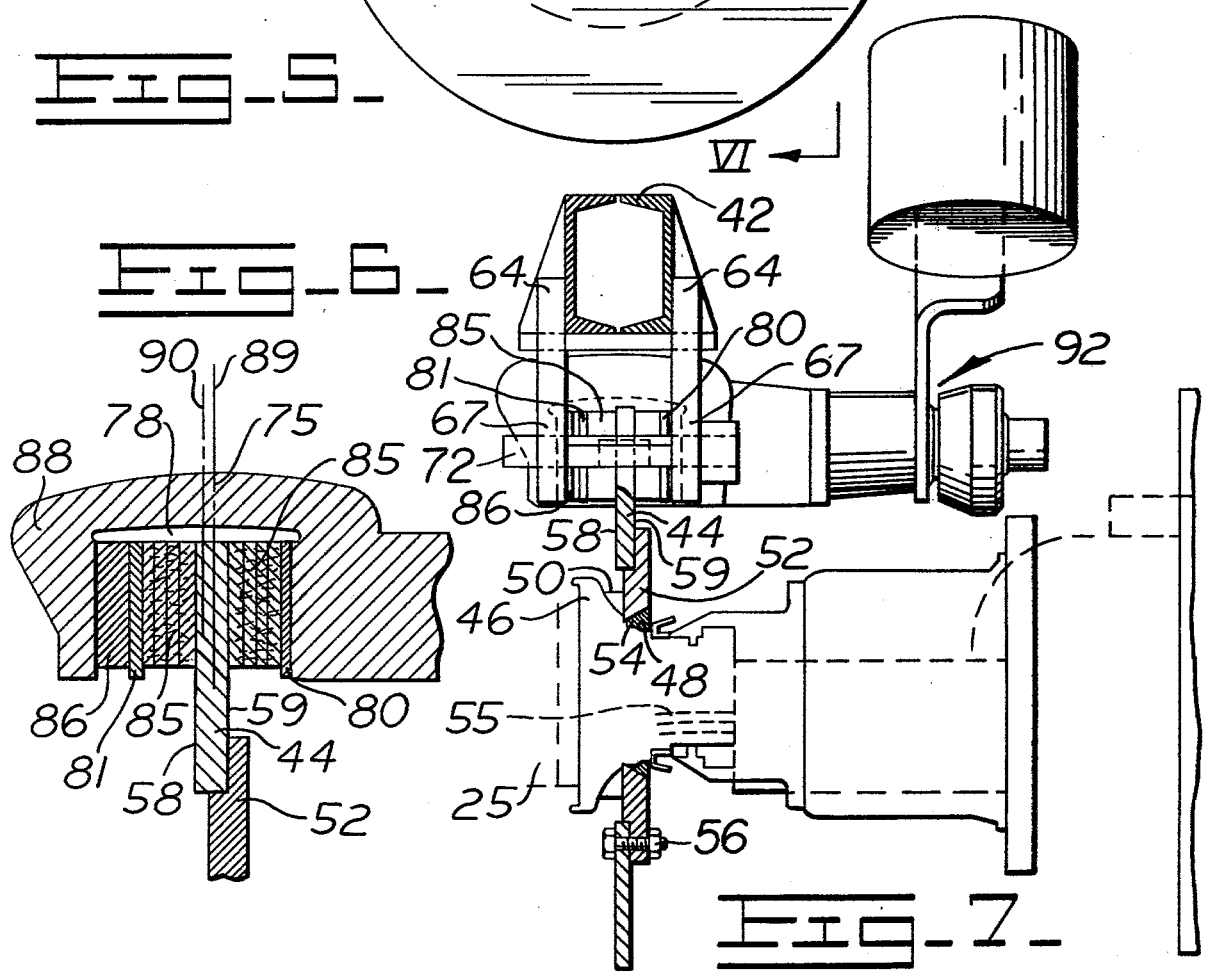

PARKING BRAKE MOUNTING

BACKGROUND OF THE INVENTION

1. Field of the Invention

This invention relates to a vehicle and, more particularly, to a brake for use on said vehicle.

2. Description of the Prior Art

Spring actuated, air release brakes have been used on vehicles for some time. Normally the brake calipers are mounted on the differential housing, on the transmission drop box or on the axle housing to engage a brake disc carried by the axles to the wheels of the vehicle such that the braking torque is transmitted directly to said differential housing, drop box or axle housing whenever the brake is applied. The mounting required pads and expensive machining to get the proper hold for the calipers. The mounting encountered problems in alignment front to rear and side to side and necessitated removal of the wheel (or wheels) to service the brake.

SUMMARY OF THE INVENTION

The present invention is directed to overcoming one or more of the problems as set forth above.

According to the present invention, a spring actuated, air release brake assembly is mounted directly on the frame of the vehicle with the caliper holding the brake pads or shoes in alignment for engaging with a brake disc secured to the drive line extending from the power source to the differential. The braking torque is applied directly into the frame instead of into the differential housing, transmission drop box or axle housing. The mounting of the caliper is such that front to rear and side to side alignment problems are substantially eliminated.

The brake pads engage the brake disc off center of the caliper so as to accommodate for a limited space situation. The brake is applied upon release of the air pressure whether said release is by actuation of the brake release controls, by loss of the air pressure due to failure of the air pressure system, or by the air reserve being consumed by usage. cl BRIEF DESCRIPTION OF THE DRAWING The details of construction and operation of the invention are more fully described with reference to the accompanying drawing which forms a part hereof and in which like reference numerals refer to like parts throughout.

In the drawing:

FIG. 1 is an elevational view of a vehicle embodying the improved brake assembly;

FIG. 2 is a plan view of the forward portion of the vehicle of FIG. 1 showing the brake assembly mounted on the frame and engaging with the drive line;

FIG. 3 is an exploded perspective view of parts of the frame and parts of the brake assembly;

FIG. 4 is another perspective view of the brake assembly and brake disc partly exploded;

FIG. 5 is an enlarged elevational view of the brake assembly on the frame and the brake disc on the drive line;

FIG. 6 is a cross-sectional view taken along the line 6—6 of FIG. 5; and,

FIG. 7 is an enlarged cross-sectional view of the caliper brake pads and brake disc taken along the line 7—7 of FIG. 5.

DESCRIPTION OF THE PREFERRED EMBODIMENT

In the drawing, the numeral 10 designates an articulated vehicle having a front portion 12 upon which is mounted a bucket 14 and a rear portion 16 carrying the engine 18, fuel tanks 20 and the operator's cab 22. The front and rear portions 12,16 of the vehicle are pivoted together at 23 by pin 24 (FIG. 2) and has a drive line 25 running from the engine 18 in the rear portion 12 through an appropriate coupling 26 into the forward portion 16, whereupon it enters a differential housing 28 from which radiates the axles 29 for supporting the front wheels 30 on the front portion 12 of the vehicle.

The invention is directed to mounting a brake assembly 40 on a cross-rail frame member 42 of the forward portion 12 of the vehicle, which brake assembly 40 is adpated to grab a brake disc 44 carried by the drive line 25 so as to arrest rotation of the drive line 25 and prevent turning of the wheels 30 on the front portion 12 of the vehicle. In one particular application of the invention, the brake assembly 40 and brake disc 44 are intended to operate as a parking brake so as to prevent movement of the vehicle at any time that the air pressure of the vehicle is not operating to neutralize the spring which activates the brake.

Referring first to FIG. 7 and then to FIGS. 2 and 3, the drive line 25 has a hub or spindle 46 which has different diametered stepped portions 48,50 with one stepped portion 48 ground away to form a seat upon which a circular coupling plate 52 is nested. A weld 54 is formed between the coupling plate 52 and the hub 46 so as to rigidly secure the coupling plate 52 to the hub 46. The hub 46 is splined to engage with splines 55 on the drive line 25. The brake disc 44 is secured, as by bolts 56 through openings 57, to the coupling plate 52 and extends radially outward from the drive line 25 and coupling plate 52. The brake disc 44 is circular in configuration and has conventional braking surfaces on the opposite faces 58,59 thereof. The brake disc 44 is adapted to rotate with the drive line 25 or, conversely, upon arresting the rotation of the brake disc 44, rotation of the drive line 25 is also arrested. The drive line 25, almost immediately forward of the connection of the hub 46 to the drive line, enters the differential housing 28 whereupon the conventional differential gears translate the rotational motion of the drive line 25 to the rotational motion of the axles 29 and the wheels 30 so that rotation of the drive line 25 is transmitted to rotation of the wheels.

Extending between the vertical side walls 60 of the vehicle 10 and rigidly connected to the brackets 62 mounted on the wall 60 of the forward portion 12 of the vehicle 10 is the crossrail or crossbeam 42 which is attached to the brackets 62 by gusset plates 63 and by welding so that the crossframe or crossbeam 42 becomes an integral and rigid part of the frame of the vehicle. A pair of inverted U-shaped support brackets 64 are rigidly secured to the sides of the crossbeam 42 as by welding, bolting, or the like. Each U-shaped bracket 64 has inwardly aligned and facing grooves 66 formed in the parallel legs 67,68 thereof with bearing blocks 69 secured in the grooves 66 to form slots 70 in each leg. The slots 70 in legs 67 and the slots 70 in legs 68 of the two brackets 64 are aligned with each other.

A commercially available spring-actuated air release brake assembly 40 is connected to the crossbeam 42 by means of a pair of guide bars 72 which pass through the aligned slots 70 in the U-shaped brackets 64 and in oppositely facing grooves 74 formed in the opposite sides of the caliper 75 of the brake assembly 40. This is best illustrated in FIGS. 3 and 4 where the caliper 75 of the brake assembly 40 has the oppositely facing grooves 74 on opposite sides thereof, in which grooves 74 the guide bars 72 are adapted to seat when said guide bars 72 are passed through the facing slots 70 of the U-shaped brackets 64. Pins 76 pass through aligned openings 77 in the bearing blocks 69 and bars 72 to hold the brake assembly 40 to the crossbeam frame 42.

The brake caliper 75 has an opening or a hollow midportion 78 in which is mounted a pair of facing brake shoes 80,81 which have outwardly facing grooves 82 on the opposite ends 84 thereof, which grooves 82 align with the grooves 74 in the opposite sides of the caliper 75. The brake shoes 80,81 have brake pads or linings 85 facing each other, which pads or linings 85 are rigidly secured to the brake shoes. A spacer 86 is provided between the brake shoe 81 and one downwardly depending leg 88 (FIG. 6) of the caliper 75 which shifts the centerline 89 of the two brake shoes 80,81 out of alignment with the centerline 90 of the opening 78 in the caliper 75. The purpose of the spacer 86 is to permit a full range of adjustments for wear of the brake linings or pads 85 even though a thinner than normal brake disc 44 is used. That is, due to various circumstances, the brake disc 44 has a thinner than normal dimension in the axial direction which would require that the brake shoes 80,81 be adjusted inwardly in the same manner as if the brake pads 85 had been worn from use. The result is that the adjustments would all be used up before the brake pads 85 are worn enough to be replaced and yet they would have to be replaced to get an effective braking action. By inserting the spacer 86 between one leg 88 of the caliper and the brake shoe 81, the full range of adjustment is available to the brake shoes 80,81 so that the brake linings or pads 85 can be worn to the full extremen while still providing effective braking action to the brake disc 44. The spacer 86 substantially centers the brake shoes 80,81 with respect to the disc 44. The guide bars 72 and the grooves 74 in the caliper 75 and grooves 82 in the brake shoes 80,81 make it possible for the brake shoes 80,81 and pads 85 to longitudinally adjust relative to the brake disc 44 so that the exact location of the caliper 75 relative to the brake disc 44 is not critical. Likewise, the guide bars 72 permit the brake shoes 80,81 to laterally adjust for warp of the brake disc 44 so that the lateral orientation of the brake shoes 80,81 is not critical relative to said brake disc. The non-criticality of the longitudinal and lateral mounting of the brake assembly 40 makes the assembly less expensive to install and to maintain while improving on its braking effectiveness.

A conventional spring-operated air release brake actuator 92 is provided for applying and releasing the brake shoes 80,81. One such spring actuator is manufactured by Gustin-Bacon Mfgr. Co., Kansas City, Mo., and is identified as a KSMRLP.H68-800. The brake assembly 40 comprised of the caliper 75 and brake shoes 80,81 is manufactured by B. F. Goodrich Co., of Troy, Ohio.

The brake assembly 40, which is operated by the actuator 92, has the brake shoes 80,81 with the brake pads 85 aligned with each other and aligned with the circumferential outwardly facing portion 91 of the brake disc 44. The operation of the brake is such that when there is no air pressure being applied to the brake assembly 40, a spring (not shown) in the brake actuator 92 will drive the two brake shoes 80,81 toward each other along the guide bars 72 so as to engage the pads 85 with the opposite faces 58,59 of the portion 91 of the brake disc 44 thereby grabbing the brake disc 44 and stopping further rotation thereof. Stopping rotation of the brake disc 44 will stop rotation of the drive line 25 to the wheels 30. The operator in the cab 22 on the vehicle 10 can apply the brake 40 by actuating a valve (not shown) to release the air pressure in the brake actuator 92 whereupon the spring will set the brake. The operator can remove the braking effect of the brake assembly 40 by actuating the valve that will admit air under pressure to the brake actuator 92 which will override the springs and permit the brake pads 85 to be withdrawn from contact with the braking faces 58,59 of the brake disc. As long as the operator maintains the air pressure on the brake actuator 92, the brake will be inoperative and the drive line 25 and brake disc 44 will be permitted to rotate freely relative to the brake assembly 40. Loss of air pressure on the vehicle or failure of one of the air hoses to the brake actuator 92 will release the air pressure on the brake and thereby permit the springs to override the air pressure and apply the brake to the brake disc 44. The same application of the brake will take place when the air reserve on the vehicle is exhausted. Shutting off the engine 18 for any reason will leave the vehicle with reserve air pressure in the system so that the brake can be held in the off position. Even with the engine shut down, the brake can be applied by activation of the valve to release the air pressure on the brake actuator or the brake can be self-applied if the air pressure reserve is depleted below a certain level. In that case, the brake will remain applied until the air pressure in the system is built up to an adequate level to override the brake springs.

In use, the brake torque transmitted through the brake disc 44 to the brake assembly 40 when the brake actuator 92 is activated, will be applied directly to the frame of the vehicle 10 through the crossbeam 42 extending between the side thereof. Thus, the frame of the vehicle 10 will absorb the brake torque when the brake is applied. This is in contrast to the prior systems where the brake assembly was mounted on the differential housing or on the transmission housing or on the axle housing such that application of the brake would apply the brake torque to the differential, transmission or axle housing which, in time, can cause problems due to the distortions and stresses placed on said housings. By positioning the brake assembly 40 on the crossbeam 42 in alignment with the brake disc 44, makes it possible to assemble the brake pads 85 with respect to the brake disc 44 so as to eliminate any problem with alignment front to rear or side to side thereof. The spacer pad 86 is provided on one side of the caliper 75 of the brake 40 to allow for a thinner brake disc 44 and still retain a full range of adjustments for the brake shoes to allow for wear of the brake pads or linings 85.

The embodiment of the invention in which an exclusive property or privilege is claimed is defined as follows:

1. In a braking system for a vehicle having a frame with a pair of spaced apart side walls, an engine carried by the frame, a drive line running from the engine to a differential, a pair of wheels carried on an axle extending from said differential and being driven by said drive line, in combination, a brake assembly acting on said drive line to stop rotation of said drive line and said wheels, a crossbeam extending between the side walls of said frame, a brake disc encircling said drive line and being rigidly attached to said drive line, said brake assembly being mounted on said crossbeam and having a caliper straddling one portion of said brake disc, said caliper being slidably mounted on said crossbeam for movement parallel to said drive line, said caliper having spaced apart brake shoes with one shoe aligned with one portion of one face and the other shoe aligned with the opposite portion of the other face of said brake disc, actuator means on said brake assembly for urging said brake shoes into contact with said brake disc and for releasing said brake shoes from said contact with said brake disc.

2. In a braking system as claimed in claim 1 wherein said actuator means includes a spring for moving said brake shoes into contact with said brake disc and includes an air pressure actuated member which will compress the spring and release the brake and wherein loss of air pressure will permit the spring to activate the brake.

3. In a braking system for a vehicle having a frame with a pair of spaced apart side walls, an engine carried by the frame, a drive line running from the engine to a differential, a pair of wheels carried on an axle extending from said differential and being driven by said drive line, in combination, a brake assembly acting on said drive line to stop rotation of said drive line and said wheels, a crossbeam extending between the side walls of said frame, a coupling plate welded to a flat on a hub on the drive line, a brake disc encircling said drive line and being secured to said coupling plate, said brake assembly being mounted on said crossbeam and having a caliper straddling one portion of said brake disc, said caliper having spaced apart brake shoes with one shoe aligned with one portion of one face and the other shoe aligned with the opposite portion of the other face of said brake disc, actuator means on said brake assembly for urging said brake shoes into contact with said brake disc and for releasing said brake shoes from said contact with said brake disc.

4. In a braking system for a vehicle having a frame with a pair of spaced apart side walls, an engine carried by the frame, a drive line running from the engine to a differential, a pair of wheels carried on an axle extending from said differential and being driven by said drive line, in combination, a brake assembly acting on said drive line to stop rotation of said drive line and said wheels, a crossbeam extending between the side walls of said frame, a brake disc encircling said drive line and being rigidly attached to said drive line, said brake assembly being mounted on said crossbeam and having a caliper straddling one portion of said brake disc, said caliper is slidably mounted on said crossbeam for axial movement relative to said differential, said caliper having spaced apart brake shoes with one shoe aligned with one portion of one face and the other shoe aligned with the opposite portion of the other face of said brake disc, said brake shoes being slidably mounted relative to said caliper whereby said caliper and said brake shoes can adjust axially relative to said brake disc, actuator means on said brake assembly for urging said brake shoes into contact with said brake disc and for releasing said brake shoes from said contact with said brake disc.

5. In a braking system as claimed in claim 4 wherein said axial movement of said caliper relative to said crossbeam is provided by a pair of inverted U-shaped brackets secured to said crossbeam, slots in said U-shaped bracket align with grooves in said caliper, and slide bars engage in said slots in the brackets and the grooves in the caliper to permit said caliper to move relative to said crossbeam.

6. In a braking system as claimed in claim 5 wherein said brake shoes have grooves in the opposite ends thereof which grooves align with and are engaged by said slide bars to permit movement of the brake shoes relative to the caliper.

7. A parking brake for a vehicle having a frame with spaced apart side portions, a drive line, a differential housing into which said drive line extends, a pair of wheels carried on an axle extending from said differential housing and being driven by said drive line, a crossbeam extending between the side portions of said frame, a brake assembly carried by said crossbeam and having a downwardly facing caliper slidably mounted on said crossbeam for movement parallel to said drive line, a brake disc encircling said drive line and being rigidly attached to said drive line, said brake disc extending into an open center of said caliper, a pair of spaced apart brake shoes carried in the open center of said caliper with one shoe aligned with one portion of one face and the other shoe aligned with the opposite portion of the other face of said brake disc, said brake shoes are slidably mounted relative to said caliper whereby said caliper and said brake shoes can adjust in a direction parallel to said drive line, and spring-actuated air pressure release means for actuating said brake assembly for urging said brake shoes against said brake disc.

* * * * *